United States Patent
Usami et al.

(10) Patent No.: US 12,165,679 B2
(45) Date of Patent: Dec. 10, 2024

(54) COUPLING BETWEEN ROTATING ELEMENTS OF A MAGNETIC STORAGE DEVICE

(71) Applicant: Western Digital Technologies, Inc., San Jose, CA (US)

(72) Inventors: Yoshiya Usami, Setagaya-ku (JP); Koichi Suzuki, Fujisawa (JP); Michio Ueha, Zama (JP); Takeshi Saito, Hiratsuka (JP)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 18/359,762

(22) Filed: Jul. 26, 2023

(65) Prior Publication Data

US 2024/0249745 A1 Jul. 25, 2024

Related U.S. Application Data (60) Provisional application No. 63/440,072, filed on Jan. 19, 2023.

(51) Int. Cl.
*G11B 5/48* (2006.01)

(52) U.S. Cl.
CPC .................. *G11B 5/4813* (2013.01)

(58) Field of Classification Search
None
See application file for complete search history.

(56) References Cited

U.S. PATENT DOCUMENTS

| | | | |
|---|---|---|---|
| 5,146,450 A | 9/1992 | Brooks et al. | |
| 5,790,348 A | 8/1998 | Gordon et al. | |
| 5,818,665 A * | 10/1998 | Malagrino, Jr. | G11B 5/4813 |
| 5,894,382 A * | 4/1999 | Hyde | G11B 21/083 |
| 6,038,105 A * | 3/2000 | Wood | G11B 5/4813 |
| 6,128,165 A | 10/2000 | Baker et al. | |
| 6,502,300 B1 | 1/2003 | Casey et al. | |
| 6,519,116 B1 * | 2/2003 | Lin | G11B 5/4813 |
| 6,678,122 B2 | 1/2004 | Koyama | |
| 6,937,444 B1 | 8/2005 | Oveyssi | |
| 7,088,557 B2 | 8/2006 | Miyamoto et al. | |
| 7,633,722 B1 * | 12/2009 | Larson | G11B 5/5569 |
| | | | 360/265.2 |
| 8,233,242 B2 * | 7/2012 | Court | F16C 27/02 |
| | | | 403/372 |
| 8,640,328 B1 | 2/2014 | Yow et al. | |

(Continued)

FOREIGN PATENT DOCUMENTS

JP 61151882 A * 7/1986

*Primary Examiner* — William J Klimowicz
(74) *Attorney, Agent, or Firm* — Kunzler Bean & Adamson (57) ABSTRACT

Disclosed herein is a magnetic storage device including a carriage with an opening. The opening defines a central axis and has multiple ridges parallel with the central axis. A cross-sectional shape of the opening, along a plane perpendicular to the central axis, includes multiple lobes, each terminating at two of the multiple ridges. The magnetic storage device also includes a pivot positioned in the opening in contact with the multiple ridges. The pivot has a cross-sectional shape, along the plane perpendicular to the central axis, that is circular. The carriage is rotatable, relative to at least one portion of the pivot, about the central axis.

20 Claims, 5 Drawing Sheets

(56) References Cited

U.S. PATENT DOCUMENTS

| | | | |
|---|---|---|---|
| 9,620,158 B2 * | 4/2017 | Araki | G11B 5/55 |
| 2003/0053260 A1 * | 3/2003 | Barina | F16C 27/04 |
| 2004/0095683 A1 * | 5/2004 | Dominguez, Jr. | G11B 5/4813 |
| 2008/0062572 A1 * | 3/2008 | Hanrahan | F16C 27/00 |
| 2010/0296197 A1 * | 11/2010 | Uefune | G11B 5/4813 |
| 2014/0002931 A1 | 1/2014 | Yanagawa et al. | |

* cited by examiner

COUPLING BETWEEN ROTATING ELEMENTS OF A MAGNETIC STORAGE DEVICE

FIELD

This disclosure relates generally to magnetic storage devices, and more particularly to improving rotation between head stack assemblies and bases of magnetic storage devices.

BACKGROUND

Magnetic storage devices, such as hard disk drives ("HDDs"), are widely used to store digital data or electronic information for enterprise data processing systems, computer workstations, portable computing devices, digital audio players, digital video players, and the like. Generally, HDDs include read-write heads that help facilitate storage of data on magnetic disks. These read-write heads are typically part of a head stack assembly that is configured to rotate relative to the disks such that the read-write heads read information from or write information to the disks. Rotating a head stack assembly in an efficient and reliable manner can be difficult.

SUMMARY

A need exists for a magnetic storage device, and associated methods of manufacture, with read/write heads that read data from and write data to disks of the magnetic storage device with little to no impediments. The subject matter of the present application has been developed in response to the present state of magnetic storage devices, and in particular, in response to problems and needs in the art, such as those discussed above, that have not yet been fully solved by currently available magnetic storage devices. Accordingly, the examples of the present disclosure overcome at least some of the shortcomings of the prior art.

The following is a non-exhaustive list of examples, which may or may not be claimed, of the subject matter, disclosed herein.

Disclosed herein is a magnetic storage device including a carriage with an opening. The opening defines a central axis and has multiple ridges parallel with the central axis. A cross-sectional shape of the opening, along a plane perpendicular to the central axis, includes multiple lobes, each terminating at two of the multiple ridges. The magnetic storage device also includes a pivot positioned in the opening in contact with the multiple ridges. The pivot has a cross-sectional shape, along the plane perpendicular to the central axis, that is circular. The carriage is rotatable, relative to at least one portion of the pivot, about the central axis. The preceding subject matter of this paragraph characterizes example 1 of the present disclosure.

The cross-sectional shape of the opening includes two lobes. The preceding subject matter of this paragraph characterizes example 2 of the present disclosure, wherein example 2 also includes the subject matter according to example 1, above.

The opening includes four ridges. The cross-sectional shape of the opening includes three lobes. The preceding subject matter of this paragraph characterizes example 3 of the present disclosure, wherein example 3 also includes the subject matter according to example 1, above.

The pivot has an outer portion and an inner portion. The magnetic storage device includes a base. The outer portion of the pivot and the carriage rotate together relative to the base and to the inner portion. The preceding subject matter of this paragraph characterizes example 4 of the present disclosure, wherein example 4 also includes the subject matter according to any of the examples 1-3, above.

The cross-sectional shape of the opening includes a circular portion terminating two of the multiple ridges. A radius of the circular portion is equal to the radius of each one of the multiple ridges. The preceding subject matter of this paragraph characterizes example 5 of the present disclosure, wherein example 5 also includes the subject matter according to any of the examples 1-4, above.

A total perimeter length of each one of the multiple lobes is less than a total perimeter length of the circular portion. The preceding subject matter of this paragraph characterizes example 6 of the present disclosure, wherein example 6 also includes the subject matter according to any of the examples 1-5, above The radii of the multiple lobes are the same. The preceding subject matter of this paragraph characterizes example 7 of the present disclosure, wherein example 7 also includes the subject matter according to any of the examples 1-6, above.

A ratio of a radius of at least a first lobe of the multiple lobes to a radius of at least a second lobe of the multiple lobes is between, and inclusive of, 1 to 1 and 1 to 4. The preceding subject matter of this paragraph characterizes example 8 of the present disclosure, wherein example 8 also includes the subject matter according to any of the examples 1-6, above.

A distance from the central axis to each one of the multiple ridges is approximately equal to a radius of the pivot so that the pivot forms a friction fit with the multiple ridges. The preceding subject matter of this paragraph constitutes example 9 of the present disclosure, wherein example 9 also includes the subject matter according to examples 1-8, above.

A radius of each one of the multiple lobes terminates at a location that is offset from the central axis of the opening. The preceding subject matter of this paragraph constitutes example 10 of the present disclosure, wherein example 10 includes any of the subject matter according to examples 1-9, above.

A quantity of the number of ridges is one greater than a quantity of the multiple lobes. The preceding subject matter of this paragraph constitutes example 11 of the present disclosure, wherein example 11 includes any of the subject matter according to examples 1-10, above.

A central angle of each of the plurality of lobes is less than 180 degrees. The preceding subject matter of this paragraph characterizes example 12 of the present disclosure, wherein example 12 also includes the subject matter according to any of examples 1-11, above.

The pivot is secured to the carriage through a pin. The preceding subject matter of this paragraph characterizes example 13 of the present disclosure, wherein example 13 also includes the subject matter according to any of examples 1-12, above.

The carriage is made of at least one of the following materials: aluminum, nickel, or any combination thereof. The preceding subject matter of this paragraph characterizes example 14 of the present disclosure, wherein example 14 also includes the subject matter according to any of examples 1-13, above.

The pivot is made of stainless steel. The preceding subject matter of this paragraph characterizes example 15 of the present disclosure, wherein example 15 also includes the subject matter according to any of examples 1-14, above.

A first number of lobes of the multiple lobes have a total perimeter length that differs from a total perimeter length of a second number of lobes of the multiple lobes. The preceding subject matter of this paragraph characterizes example 16 of the present disclosure, wherein example 16 also includes the subject matter according to any of examples 1-6 or 8-15, above.

Also disclosed herein is a magnetic storage device having a carriage. The carriage has an opening defining a central axis and having multiple ridges parallel with the central axis. A cross-sectional shape of the opening, along a plane perpendicular to the central axis, includes a first lobe and a second lobe, each of the first lobe and the second lobes terminating at two of the multiple ridges. The preceding subject matter of this paragraph characterizes example 17 of the present disclosure.

A ratio of a semi-minor axis of the second lobe to a semi-major axis of the second lobe is between 1 to 1.01 and 1 to 1.2. The preceding subject matter of this paragraph characterizes example 18 of the present disclosure, wherein example 18 also includes the subject matter according to example 17 above.

A central angle of the second lobe is greater than 180 degrees. A central angle of the first lobe is less than 180 degrees. The device comprises a hard disk drive (HDD). The preceding subject matter of this paragraph characterizes example 19 of the present disclosure, wherein example 19 also includes the subject matter according to any of examples 17-18, above.

Also disclosed herein is a magnetic storage device having a base coupled to a number of disks, a pivot coupled to a base, a carriage coupled to the pivot through a pin, and a pivot. The carriage includes an opening defining a central axis. A cross-sectional shape of the opening, along a plane perpendicular to the central axis, comprises multiple lobes each terminating at two of the multiple ridges. The carriage also includes a distal end having a read/write head configured to read data from and/or write data to at least one disk of the number of disks. The pivot is positioned in the opening in contact with the multiple rides. The pivot has a cross-sectional shape, along the plane perpendicular to the central axis, that is circular. The carriage is rotatable, relative to at least a portion of the pivot, about the central axis. The preceding subject matter of this paragraph characterizes example 20 of the present disclosure.

The described features, structures, advantages, and/or characteristics of the subject matter of the present disclosure may be combined in any suitable manner in one or more examples and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example or implementation. In other instances, additional features and advantages may be recognized in certain examples and/or implementations that may not be present in all examples or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the disclosure will be readily understood, a more particular description of the disclosure briefly described above will be rendered by reference to specific examples that are illustrated in the appended drawings. Understanding that these drawings depict only typical examples of the disclosure and are not therefore to be considered to be limiting of its scope, the subject matter of the present application will be described and explained with additional specificity and detail through the use of the accompanying drawings, in which.

DETAILED DESCRIPTION

Reference throughout this specification to "one example," "an example," or similar language means that a particular feature, structure, or characteristic described in connection with the example is included in at least one example of the present disclosure. Appearances of the phrases "in one example," "in an example," and similar language throughout this specification may, but do not necessarily, all refer to the same example. Similarly, the use of the term "implementation" means an implementation having a particular feature, structure, or characteristic described in connection with one or more examples of the present disclosure, however, absent an express correlation to indicate otherwise, an implementation may be associated with one or more examples.

Figure 1:
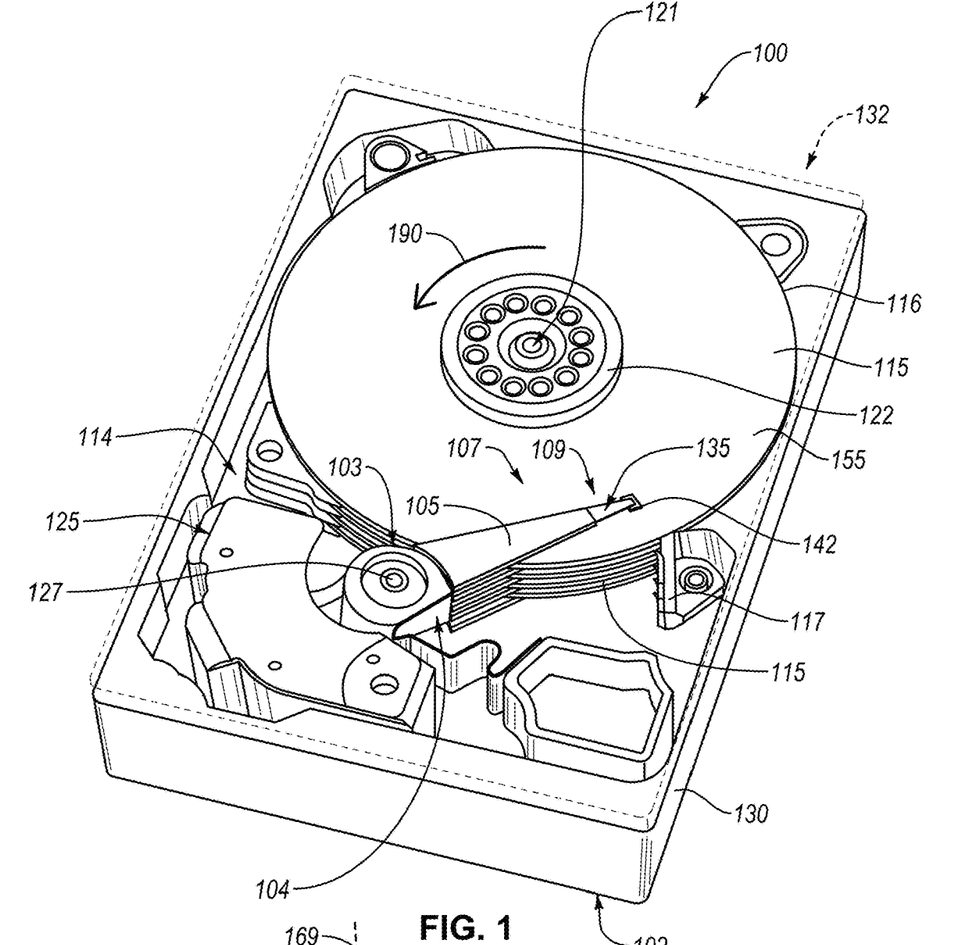
FIG. 1 is a perspective view of a magnetic storage device, according to one or more examples of the present disclosure.

Referring to FIG. 1, a magnetic storage device 100, according to one example, is depicted as a hard disk drive (HDD). However, in other examples, the magnetic storage device 100 can be any of various magnetic storage devices without departing from the essence of the subject matter of the present disclosure. The magnetic storage device 100 includes a housing 102 that seals or encloses an interior cavity 114 defined within the housing. The housing 102 includes a base 130 and a cover 132 (shown in dashed lines so as not to obscure internal features of the magnetic storage device 100 within the interior cavity 114 of the housing 102). The cover 132 is coupled to the base 130 to enclose the interior cavity 114 from the environment exterior to the housing 102. In some implementations, a seal or gasket is positioned between the base 130 and the cover 132 to promote a seal between the base 130 and the cover 132.

The magnetic storage device 100 includes various features located within the interior cavity 114 of the housing 102. In some examples, the magnetic storage device 100 includes a carriage 103, disks 115, a spindle motor 121, and a voice coil motor (VCM) 125 within the interior cavity 114. The carriage 103 includes a head stack assembly 107 that includes a plurality of carriage arms 105 and at least one head-gimbal assembly 109 (e.g., suspension) coupled to the distal tip of each carriage arm of the plurality of carriage arms 105. In the illustrated example of FIG. 1, only one head-gimbal assembly 109 is shown coupled to the distal tip of each carriage arm 105 of the plurality of carriage arms 105. However, it is noted that each carriage arm 105 may have another head-gimbal assembly 109 on an opposite side of the carriage arm, which mirror the head-gimbal assembly 109 shown. Each head-gimbal assembly 109 includes a suspension assembly 135 and a slider 142. The slider 142 includes at least one read-write head coupled to (e.g., embedded in) the slider 142.

Although the magnetic storage device 100 in FIG. 1 is shown to have five carriage arms 105 and four disks 115, in other examples the magnetic storage device 100 can have fewer or more than five carriage arms 105 or fewer or more than four disks 115. In one example, each side of each carriage arm 105 facing a disk 115 has a head-gimbal assembly 109 (e.g., each of bottom and top carriage arms 105 can have one head-gimbal assembly 109 and each of middle carriage arms 105, between the bottom and top carriage arms 105, can have two head-gimbal assemblies 109). Similarly, although the magnetic storage device 100 is shown to have one spindle motor 121 and one VCM 125, in other examples, the magnetic storage device 100 can have any number of spindle motors 121 and VCMs 125.

The spindle motor 121 is coupled to the base 130. Generally, the spindle motor 121 includes a stationary portion non-movably fixed relative to the base 130 and a spindle that is rotatable relative to the stationary portion and the base 130. Accordingly, the spindle of the spindle motor 121 can be considered to be part of or integral with the spindle motor. Generally, the spindle motor 121 is operable to rotate the spindle relative to the base 130. The disks 115, or platters, are co-rotatably fixed to the spindle of the spindle motor 121 via respective hubs 122, which are co-rotatably secured to respective disks 115 and the spindle. As the spindle of the spindle motor 121 rotates, the disks 115 correspondingly rotate. In this manner, the spindle of the spindle motor 121 defines a rotational axis of each disk 115. The spindle motor 121 can be operatively controlled to rotate the disks 115, in a rotational direction 190, a controlled amount at a controlled rate.

Each of the disks 115 may be any of various types of magnetic recording media. Generally, in one example, each disk 115 includes a substrate and a magnetic material applied directly or indirectly onto the substrate. For example, the magnetic material of the disks 115 may be conventional granular magnetic recording disks or wafers that have magnetic layer bits with multiple magnetic grains on each bit. In granular magnetic media, all of the bits are co-planar and the surface 116 of the disk is substantially smooth and continuous. In one example, each bit has a magnetic dipole moment that can either have an in-plane (longitudinal) orientation or an out-of-plane (perpendicular) orientation.

As the disks 115 rotate in a read-write mode, the VCM 125 electromagnetically engages voice coils of the carriage arms 105 to rotate the carriage arms 105, and the head-gimbal assemblies 109, which are coupled to the carriage arms 105, relative to the disks 115 in a rotational direction along a plane parallel to read-write surfaces 155 of the disks 115. The carriage arms 105 can be rotated to position the read-write head of the head-gimbal assemblies 109 over a specified radial area of the read-write surface 155 of a corresponding disk 115 for read and/or write operations. The VCM 125 is fixed to the base 130 in engagement with the voice coils of the carriage arms 105, which are rotatably coupled to the base 130 via a spindle 127 extending through the carriage 103. Generally, the spindle 127 defines a rotational axis about which the carriage arms 105 rotate when actuated by the VCM 125.

The carriage arms 105 are non-movably fixed to (e.g., integrally formed as a one-piece unitary monolithic body with) and extend away from a base of the carriage 103 in a spaced-apart manner relative to each other. In some implementations, the carriage arms 105 are spaced an equi-distance apart from each other and extend parallel relative to each other. A respective one of the disks 115 is positioned between adjacent carriage arms 105. In an idle mode (e.g., when read-write operations are not being performed), the VCM 125 is actuated to rotate the carriage arms 105, in a radially outward direction relative to the disks 15, such that the head-gimbal assemblies 109 are parked or unloaded onto a ramp support 117 secured to the base 130.

Each read-write head of the slider 142 includes at least one read transducer and at least one write transducer. The read transducer is configured to detect magnetic properties (e.g., magnetic bit patterns) of a disk 115 and convert the magnetic properties into an electrical signal. In contrast, the write transducer changes the magnetic properties of a disk 115 responsive to an electrical signal. For each head-gimbal assembly 109, the electrical signals are transmitted from and to the read-write head via electrical traces or lines formed in or coupled to the slider 142 and the flexure. The electrical traces of the slider 142 and the flexure are electrically interconnected to facilitate transmission of electrical signals between the read-write head and a flex connector 104 of the magnetic storage device 100, which is in communication with a control module of the magnetic storage device 100 (see, e.g., FIG. 1). The control module is configured to process the electrical signals and facilitate communication of the electrical signals between the magnetic storage device 100 and one or more external computing devices. Generally, the control module includes software, firmware, and/or hardware used to control operation of the various components of the magnetic storage device 100. The control module may include a printed circuit board on or in which the hardware is mounted. As is described in more detail below, solder weldments are utilized to electrically connect corresponding electrical contact pads (and corresponding electrical traces) of the slider 142 and the flexure.

Although not shown, in some implementations, the head-gimbal assembly 109 also includes a head actuator selectively operable to move the read-write head relative to a hinge portion of the flexure 140.

Figure 2:
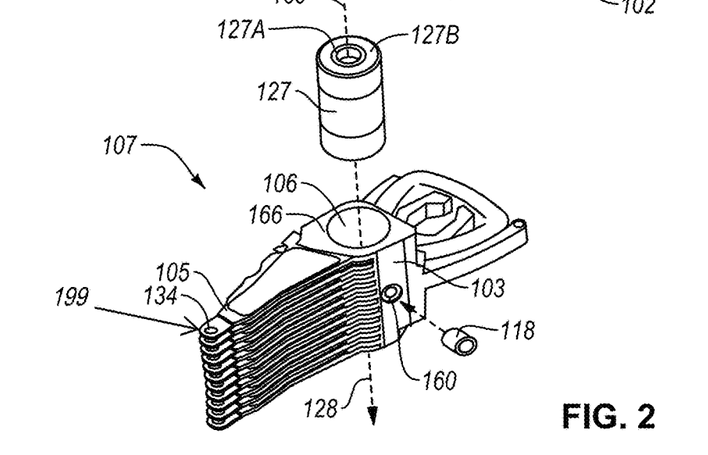
FIG. 2 is a perspective view of a carriage of a magnetic storage device, according to one or more examples of the present disclosure.

FIG. 2 is a perspective view of a carriage 103 of a magnetic storage device (e.g., the magnetic storage device 100 of FIG. 1), according to one or more examples of the present disclosure. The carriage 103 includes a main body 166 and a head stack assembly 107 coupled to and extending from the main body 166. The head stack assembly 107 includes a plurality of carriage arms 105. In some examples, the head stack assembly 107 is a stack of multiple carriage arms 105, where each carriage arm 105 includes a distal end 199. Although not shown in FIG. 2, each distal end 199 may include one or more head-gimbal assemblies (e.g., the head-gimbal assembly 109 of FIG. 1). Through the read/write head 134, data may be read from or written to one or more disks (e.g., disks 115 of FIG. 1) of the magnetic storage device 100. Although FIG. 2 illustrates a head stack assembly 107 with eleven carriage arms 105, other examples of the present disclosure are not so limited. Accordingly, the head stack assembly 107 may include any number of carriage arms 105. One of skill in the art will appreciate that features described herein in connection with any particular carriage arm 105 may also be applicable to any other one of the carriage arms 105 of the head stack assembly 107, unless specifically noted otherwise.

The carriage 103 rotates with respect to the base 130 of the magnetic storage device 100 to enable the read-write heads (e.g., read-write heads 134 of FIGS. 1 and 2) coupled to the carriage arms 105, to contact the disks 115. As such, the carriage 103 includes a pivot 127 (e.g., the spindle 127 of FIG. 1) having a portion that is fixed relative to the base 130 (e.g., inner portion 127A) and rotatable relative to the base 130 (e.g., outer portion 127B). As described in more detail below, the main body 166 and the carriage arms 105 are coupled to the pivot 127 such that the main body 166 and the carriage arms 105 rotate about a pivot axis 169, defined by the pivot 127, with respect to the base 130. The pivot 127 is received in an opening 106 of the main body 166, which extends entirely through the main body 166.

In some examples, the pivot 127 includes an inner portion 127A and an outer portion 127B. The outer portion 127B of the pivot 127 rotates, about the pivot axis 169, with respect to the inner portion 127A of the pivot 127. The inner portion 127A is co-rotatably fixed to the base 130 so that the inner portion 127A cannot rotate relative to the base 130. The carriage 103, including the main body 166 and the carriage arms 105, is co-rotatably fixed to the outer portion 127B so that the carriage 103 cannot rotate relative to the carriage 103. Thus, the outer portion 127B co-rotates with the carriage 103, and the outer portion 127B and the carriage 103 rotate with respect to the base 130 of the magnetic storage device 130. The pivot 127 additionally includes bearings between the outer portion 127B and the inner portion 127A to facilitate relative rotation, in a reduced friction manner, between the inner portion 127A and the outer portion 127B.

Although not illustrated in FIG. 2, in some examples, a portion of the pivot 127 is rotatable via a VCM (e.g., VCM 125 shown in FIG. 1) of the magnetic storage device 100. For example, an outer portion 127B of the pivot 127 (or a "rotatable portion") is coupled to and driven by the VCM. As such, the VCM causes the outer portion 127B of the pivot 127, and hence the carriage 103, to rotate with respect to the base 130 and to the inner portion 127A (the "stationary portion") of the pivot 127. In other examples, the VCM electromagnetically engages voice coils of the carriage arms 105 to rotate the carriage arms 105, which thus rotates an outer portion 127B of the pivot 127 due to a friction fit between the outer portion 127B and the carriage 103.

In some examples, the pivot 127 is secured to the carriage 103 by a set screw 118. For example, the set screw 118 passes through and threadably engages side opening 160 formed in the main body 166. A tip of the set screw 118 engages the outer portion 127B of the pivot 127 to secure or lock the main body 166, and thus the entirety of the carriage 103, to the outer portion 127B. In some examples, the set screw 118 is cylindrical in shape. Although referred to as a "set screw" herein, examples of the present disclosure are not so limited. In some examples, means other than a set screw can be used to co-rotatably secure the outer portion 127B of the pivot 127 to the carriage 103.

The carriage 103 is made of a first material that can include at least one of the following materials: aluminum, nickel, or any combination thereof. The pivot 127 is made of a second material, such as stainless-steel, that is different than the first material.

Figure 3A:
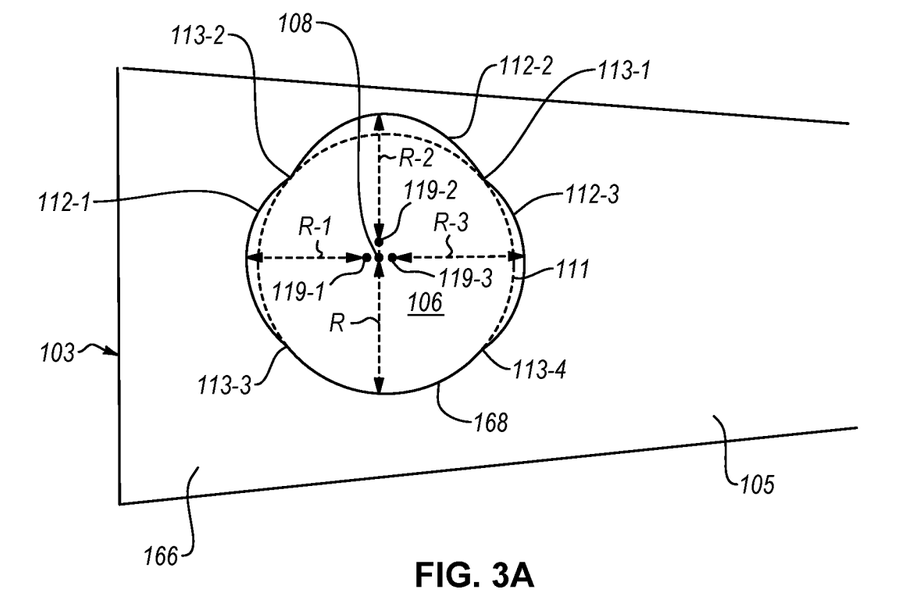
FIG. 3A is a top plan view of an opening of a carriage of a magnetic storage device, according to one or more examples of the present disclosure.

Referring to FIG. 3A, a cross-section of a hypothetical opening 111 for receiving the pivot 127 is shown. The hypothetical opening 111 has a circular shape (and may be referred to herein as a "circular shape 111") that defines a central axis 108 that is coaxial with the central axis 169 defined by the pivot 127 when the pivot 127 is within the hypothetical opening 111. The radius R of the hypothetical opening 111 is substantially equal to (e.g., just larger than) a maximum radius of the pivot 127, such that the pivot 127 would form a friction fit with the entire circumferential surface of the hypothetical opening 111. However, as described above, because of the different materials of the carriage 103 and the pivot 127, temperature differentials may be formed during operation of the magnetic storage device 100, which can lead to thermal expansion and contraction of the carriage 103 and the pivot 127 relative to each other. Such relative thermal expansion between the carriage 103 and the pivot 127 can induce vibrations in the carriage 103, including at the read/write head 134. Such vibrations are problematic because they can degrade the quality of data transmission between the heads 134 and the disks 115. Additionally, excessive area of contact between the pivot 127 and the surface of the opening 106 in the carriage 103 can cause a slipping effect, which involves the outer portion 127B of the pivot 127 rotating with respect to the carriage 103. The slipping effect prevents the carriage 103, and thus the carriage arms 105, from rotating with the outer portion 127B of the pivot 127 as smoothly, quickly, and seamlessly as possible. Reducing the area of contact between surface of the opening in the carriage 103 and the outer portion 127B of the pivot 127 is desirable to reduce vibrations in the carriage 103 and to ensure reliable co-rotation of the outer portion 127B of the pivot 127 and the carriage 103. Examples for reducing the areas of contact between the pivot 127 and the carriage 103 will now be described in association with FIGS. 3A-5B.

Although not explicitly shown in FIGS. 3A-5B, those of skill in the art will appreciate that the opening 106 and pivot 127 illustrated therein are parts of a magnetic storage device 100. As described above in connection with FIG. 1, the magnetic storage device 100 includes a base 130 coupled to a number of disks 115.

Referring to FIGS. 3A-5B, a cross-sectional shape of the opening 106, on a plane perpendicular to a central axis 108 of the opening 106, is non-circular. In other words, although the cross-sectional shape of the opening 106 may be partially circular (e.g., portion 111), the total cross-sectional shape of the opening 106 is not a circle. In the illustrated examples, the pivot 127 has a circular cross-sectional shape along the plane perpendicular to the central axis 108, such that the pivot 127 has a cylindrical in shape. The pivot 127 can have any of various other shapes that suitably correspond with the shape of the opening 106. When the pivot 127 is received within the opening 106, the pivot axis 169 is coaxial with the central axis 108 of the opening 106.

The opening 106 is slightly larger than the pivot 127 (i.e., a minimum dimension (e.g., minimum radius) from an edge of the opening 106 away from the central axis 108 is at least slightly larger than the radius R-4 of the pivot 127). The small difference creates a friction fit between the carriage 103 and the pivot 127. The pivot 127 fits within the opening 106 but contacts at least some portions of the edges of the opening 106 formed in the main body 166 of the carriage 103. In some examples, the opening 106 has a minimum diameter that is less than one percent greater than the diameter of the pivot 127. The contact between the edges of the opening 106 and the pivot 127 causes the carriage 103, and thus the carriage arms 105, to rotate with the pivot 127 when the pivot 127 rotates.

FIG. 3A is a top plan view of the opening 106 of the carriage 103 of a magnetic storage device (e.g., the magnetic storage device 100 of FIG. 1), according to one or more examples of the present disclosure. To reduce contact between the pivot 127 and the carriage 103, the opening 106 is enlarged along one or more portions of the opening 106. In the illustrated example of FIG. 3A, the opening 106 includes a regular portion 168 and three enlarged portions (e.g., a first lobe 112-1, a second lobe 112-2, and a third lobe 112-3). In some examples, a regular portion 168 of the opening 106 is a portion of the edge of the opening 106 that is coincident with the hypothetical circular shape 111. The regular portion 168 is curved.

As stated above, a cross-section shape of the opening, along a plane perpendicular to the central axis 108, includes multiple lobes (e.g., lobes 112-1, 112-2, and 112-3 of FIG. 3A). As used herein, the term "lobe" may be used to describe any portion of a cross-sectional shape of the opening 106 that extends at least partially radially and outwardly. For example, a "lobe" may be a portion of an arc, a circle, or have some other shape, such as polygonal. A "lobe" may be referred to as an "enlarged portion" of the opening 106. In some examples, lobes 112-1 to 112-3 are each shaped relatively symmetrically. In other examples, one or more of the lobes 112-1 to 112-3 are shaped asymmetrically.

In some examples, each one of the lobes may define an arc with a center point that is offset laterally from the central axis 108 (e.g., the center of the regular portion 168). In the illustrated example, each one of the multiple lobes 112-1 to 112-3 has a corresponding radius (e.g., R-1, R-2, or R-3) defined from a corresponding location (i.e., center point 119-1, center point 119-2, or center point 119-3) that is offset from the central axis 108 of the opening 306. Although FIG. 3A illustrates center points 119-1, 119-2, and 119-3 that are offset by only a relatively small distance from the central axis 108, examples of the present disclosure are not so limited. In some examples, one or more of the lobes 112-1 to 112-3 has a center point 119-1 to 119-3 that is positioned at a point on or near to an edge of the hypothetical opening 111.

Other than the enlarged portions, the remainder of the opening 106 (e.g., the regular portion 168) has a radius R, centered at the central axis 108, that is just larger than the radius R-4 of the pivot 127 and larger than the radii R-1, R-2, R-3 of the first lobe 112-1, the second lobe 112-2, and the third lobe 112-3. In some examples, a ratio of the radius R of the regular portion 168 to the radius of at least one of the lobes is between 1 to 1 and 1 to 4. This ratio may apply to just one lobe, to all of the lobes, or to any number of the lobes. Center points of the lobes 112 may be offset from the central axis 108 either horizontally (i.e., towards or away from the carriage arm 105) or vertically. For example, in FIG. 3A, center point 119-2 of lobe 112-2 is offset vertically from the central axis 108, and center point 119-1 of lobe 112-1 is offset horizontally (i.e., away from the carriage arm 105) from the central axis 108.

In some examples, the radii R-1, R-2, and R-3 of each of the multiple lobes 112 are equal. However, in other examples, certain lobes of the multiple lobes 112-1, 112-2, and 112-3 have a greater radius than other lobes. A first number of lobes (e.g., lobes 112-1 and 112-3) of the multiple lobes 112 have a total perimeter length that differs from a total perimeter length of the second number of lobes (e.g., 112-2) of the multiple lobes. A first number of lobes (e.g., lobes 112-1 and 112-3) have a radius that is smaller than a radius of a second number of lobes (e.g., lobe 112-2). For example, a ratio of a radius (e.g., R-1 and R-3) of a first number of lobes (e.g., 112-1 and 112-3) of the multiple lobes 112-1, 112-2, and 112-3 and a radius (e.g., R-2) of a second number of lobes (e.g., lobe 112-2) of the multiple lobes 112-1, 112-2, and 112-3 is between 1 to 1.05 and 1 to 2.6. For example, as illustrated in FIG. 3A, the radius R-2 of one lobe 112-2 is greater than the radii R-1 and R-3 of other lobes 112-1 and 112-3. R-2 is, for example, around 5 millimeters, and R-1 and R-3 are, for example, around 3.8 millimeters. In another example, R-2 is around 5 millimeters and R-1 and R-3 are each around 2.2 millimeters. However, examples of the present disclosure are not so limited. For example, R-1 and R-3 may be in the range of 1 to 4.6 millimeters, and R-2 may be in the range of 4 to 6 millimeters. In some examples, an optimal ratio of the radii R-1 and R-3 of two other lobes 112-1 and 112-3 to the radius R-2 of the lobe 112-2 is between 1 to 1.04 and 1 to 1.58. The dimensions described in the preceding paragraph are exemplary. Such dimensions may be optimal to minimize contact between the pivot 127 and the main body 166 of the carriage 103, thus reducing slipping and thermal expansion.

Figure 3B:
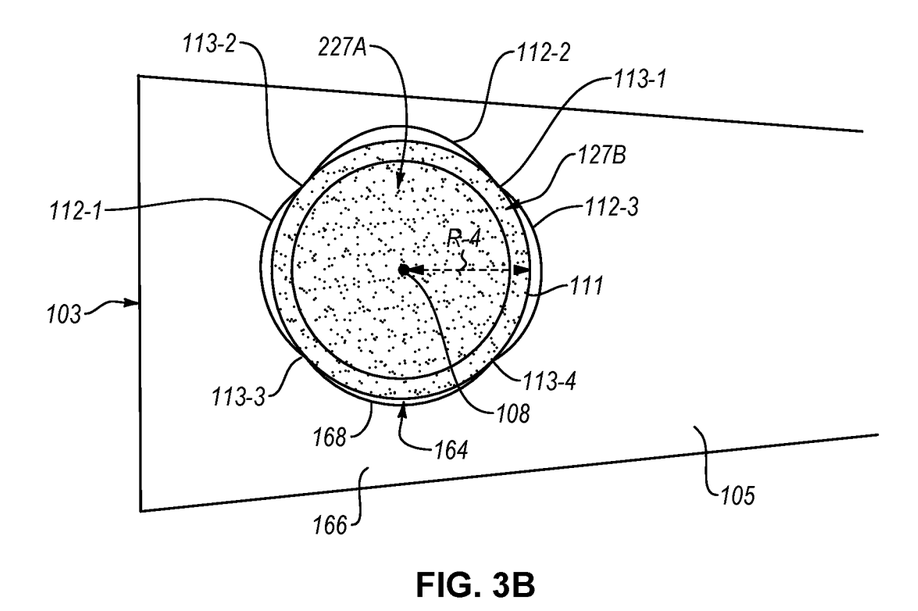
FIG. 3B is a top plan view of a pivot within the opening of the carriage of FIG. 3A, according to one or more examples of the present disclosure.

Although not illustrated in FIG. 3B, in some examples, the length of the perimeter of each one of the lobes (e.g., 112-1, 112-2, and 112-3 of FIG. 3B) is the same. In some examples, a total perimeter length of each one of the multiple lobes is less than a total perimeter length of the regular portion 168.

The opening 106 also includes multiple ridges (e.g., ridges 113-1, 113-2, 113-3, and 113-4 of FIG. 3A) extending parallel to a thickness of the main body 166 and thus parallel to the central axis 108. Each one of the multiple ridges is defined by the intersection between two enlarged portions (e.g., the intersection between the first lobe 112-1 and the second lobe 112-2 in FIG. 3A) or the intersection between an enlarged portion and the regular portion (e.g., the intersection between the first lobe 112-1 and the regular portion 168 in FIG. 3A). For example, in the illustrated example of FIG. 3A, the opening 106 includes four ridges (e.g., a first ridge 113-1, a second ridge 113-2, a third ridge 113-3, and a fourth ridge 113-4). The first ridge 113-1 is defined by the intersection between lobes 112-3 and 112-2. The second ridge 113-2 is defined by the intersection between lobes 112-2 and 112-1. The third ridge 113-3 is defined by the intersection between lobe 112-1 and the regular portion 168. The fourth ridge 113-4 is defined by the intersection between lobe 112-3 and the regular portion 168. Each one of the ridges defines a surface that contacts the pivot 127.

In some examples, a quantity of the number of ridges may be greater than a quantity of the multiple lobes. For example, as illustrated in FIG. 3A, the cross-section of the opening 106 includes three lobes 112-1, 112-2, and 112-3. The cross-section of the opening 106 also includes four ridges 113-1, 113-2, 113-3, and 113-4. Each ridge 113 is an end of at least one of the lobes 112, if not two of the lobes 112.

FIG. 3B is a top plan view of a pivot 127 within the opening 106 of the carriage 103, according to one or more examples of the present disclosure. The pivot 127 is positioned in the opening 106 in contact with the multiple ridges 113-1, 113-2, 113-3, and 113-4.

As illustrated in FIG. 3B, the pivot 127 is placed such that the pivot 127 contacts the carriage 103 only at the ridges (e.g., the first ridge 113-1, the second ridge 113-2, the third ridge 113-3, and the fourth ridge 113-4). In other words, the ridges are the only points of contact between the pivot 127 and the carriage 103. Accordingly, the pivot 127 does not contact the surfaces of the opening 106 defining the lobes (e.g., lobes 112-1, 112-2 and 112-3 in FIG. 3A) or the regular portion 168, such that a gap (e.g., gap 164) is defined between the pivot 127 and the carriage 103 at the lobes and the regular portion 168.

Furthermore, the ridges 113-1, 113-2, 113-3, and 113-4 further enhance the friction fit between the pivot 127 and the carriage 103 referenced above by contacting the pivot 127. This allows the outer portion 127B of the pivot 127B to remain relatively stationary with respect to the carriage 103, even while the outer portion 127B rotates with respect to the inner portion 127A. The carriage 103 then rotates with respect to the inner portion 127A, which is fixed to the base 130 of the device 100. This allows the carriage arms 105 to move into position such that the read/write heads 134 may contact and exchange data with the disks 115. Examples of the present disclosure allow for this rotation without expanding the area of contact between the pivot 127 and the carriage 103, regardless of differences in the materials, temperatures, or roughness of the carriage 103 and the pivot 127.

A distance from the central axis 108 to each one of the multiple ridges 113-1, 113-2, 113-3, and 113-4 (or the radius R of the circular shape 111) is approximately equal to the radius R-4 of the pivot 127. In some examples, the radius R-4 of the pivot 127 is slightly smaller than the distance from the central axis 108 to each one of the multiple ridges 113-1, 113-2, 113-3, and 113-4(R). In some examples, the friction fit is further supported by the pin 118 described in connection with FIG. 2, which can provide an additional point of contact with the outer portion 127B of the pivot 127.

Figure 3C:
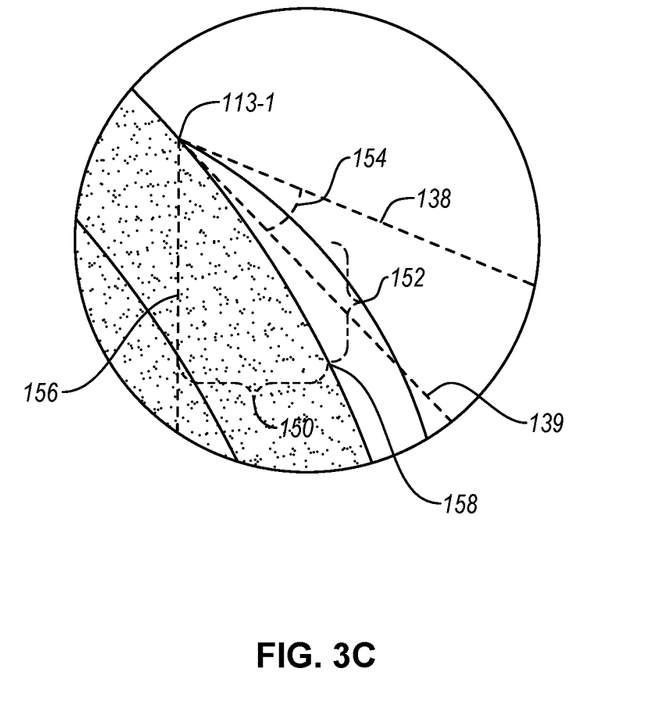
FIG. 3C is an enlarged view of a ridge of the opening of the carriage of FIGS. 3A and 3B, according to one or more examples of the present disclosure.

FIG. 3C is an enlarged view of the ridge 113-1 of FIG. 3B, which may be exemplary of any of the ridges 113-1, 113-2, 113-3, and/or 113-4. The geometry of the ridge 113-1 may be optimized to minimize contact between the pivot 127 and the carriage 103 and thus minimize risk of signal degradation. Various lines are described in connection with FIG. 3C. For the purposes of FIG. 3C, a "line" refers to a hypothetical line and does not refer to any physical component of the magnetic storage device 100. Therefore, "drawing a line" is done only hypothetically and for the purposes of designing the lobes 112-1, 112-2, and/or 112-3. Line 138 is a line tangential to the lobe 112-3 at the ridge 113-1, which is the location at which the lobe 112-3 meets the adjacent lobe 112-2. Line 139 is a line tangential to the pivot 127 at the ridge 113-1. In some examples, the angle 154 between line 138 and line 139 is optimized to reduce contact between the pivot 127 and the carriage 103 at the ridge 113-1. For example, the angle 154 may optimally be equal to approximately 6 degrees. However, examples of the present disclosure are not so limited and include other angles 154.

In some examples, a gap 152 between the pivot 127 and the lobe 112-3 is also optimized. One method of optimization, according to examples of the present disclosure, includes first drawing a hypothetical line 156 in a first direction from the ridge 113-1. The line 156 is within the same horizontal plane as cross-section of the opening 106, which is a plane perpendicular to the central axis 108. In some examples, the line 156 is substantially parallel to an edge of the carriage 103. In some examples, the line 156 is substantially perpendicular to the hypothetical line in FIG. 3B representing the radius R-4 of the pivot. Next, a point 158 along the pivot 127 is located. The distance 150 in a second direction from the point 158 to the line 156 may be optimized to reduce contact between the carriage 103 and the pivot 127 at the ridge 113-1. The second direction is a direction perpendicular to the first direction and is within the horizontal plane parallel to a cross-section of the opening 106 or perpendicular to the central axis 108. For example, this distance 150 may be 0.1 millimeters. In such examples, the method includes locating a point 158 at which the distance 150 between the edge of the pivot 127 and the line 156 is approximately 0.1 millimeters. Due to the curvature of the pivot, this distance 150 increases or decreases at different points along the pivot 127.

In some examples, the distance 152 in the first direction between the location 158 and the edge of the lobe 112-3, or the gap between the lobe 112-3 and the pivot 127, is also optimized. For example, an optimal distance 152 may be 0.015 millimeters. In such examples, the lobe 112-3 is designed and formed such that the distance 152 is approximately equal to 0.015 millimeters. In some examples, the lobe 112-3 is designed and formed such that the distance 152 is approximately 0.015 millimeters, the distance 150 is approximately 0.1 millimeters, and the angle 154 is approximately 6 degrees. Examples of the present disclosure include, but are not limited to, a range of 0.08 to 0.12 millimeters for the distance 150, a range of 0.012 to 0.018 millimeters for the distance 152, and a range of 5 to 7 degrees for the angle 154. However, dimensions outside of these ranges may be suitable in certain examples.

Forming the lobes (e.g., lobes 112-1, 112-2, and 112-3) of the opening 106 and the ridges (e.g., ridges 113-1, 113-2, 113-3, and 113-4) of the carriage 103 may include etching, drilling, reaming, or any combination thereof.

Figure 4A:
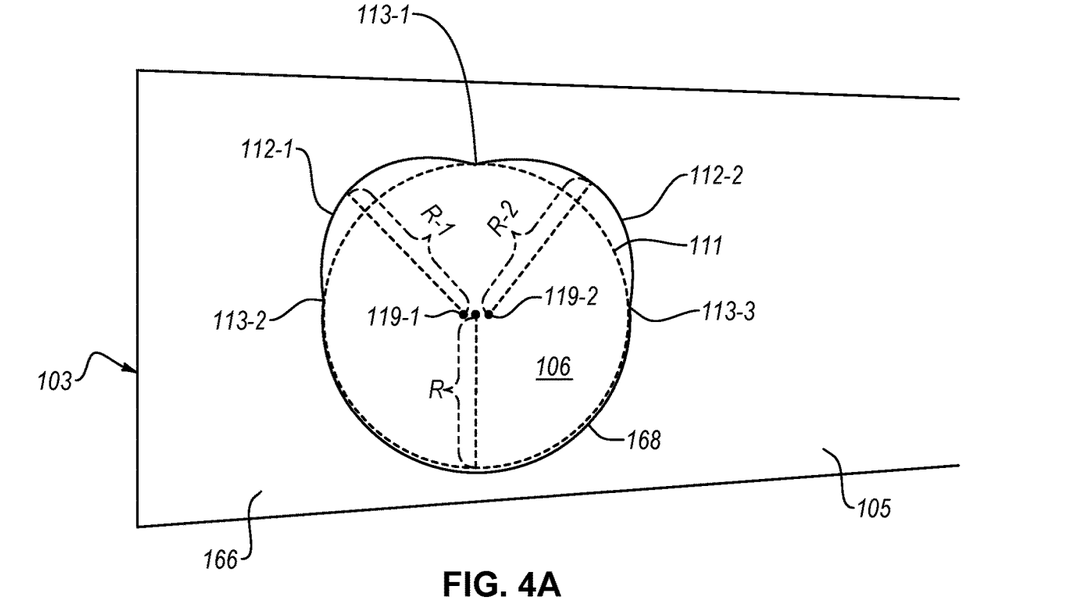
FIG. 4A is a top plan view of an opening of a carriage of a magnetic storage device, according to one or more examples of the present disclosure.

FIG. 4A is a top plan view of an opening 106 of a main body 166 of a carriage 103, according to one or more examples of the present disclosure. As illustrated in FIG. 4A, the cross-sectional shape of the opening 106 includes a regular portion 168 and only two enlarged portions (i.e., lobes 112-1 and 112-2) as opposed to the three enlarged portions (lobes 112-1, 112-2, and 112-3) illustrated in FIGS. 3A and 3B. In some examples, the two lobes 112-1 and 112-2 are adjacent to each other, as illustrated in FIG. 4A. However, examples of the present disclosure are not so limited. In some examples, the cross-section of the opening 106 includes an additional section of the regular portion 168 between the two lobes 112-1 and 112-2 such that they are not immediately adjacent to one another.

Figure 4B:
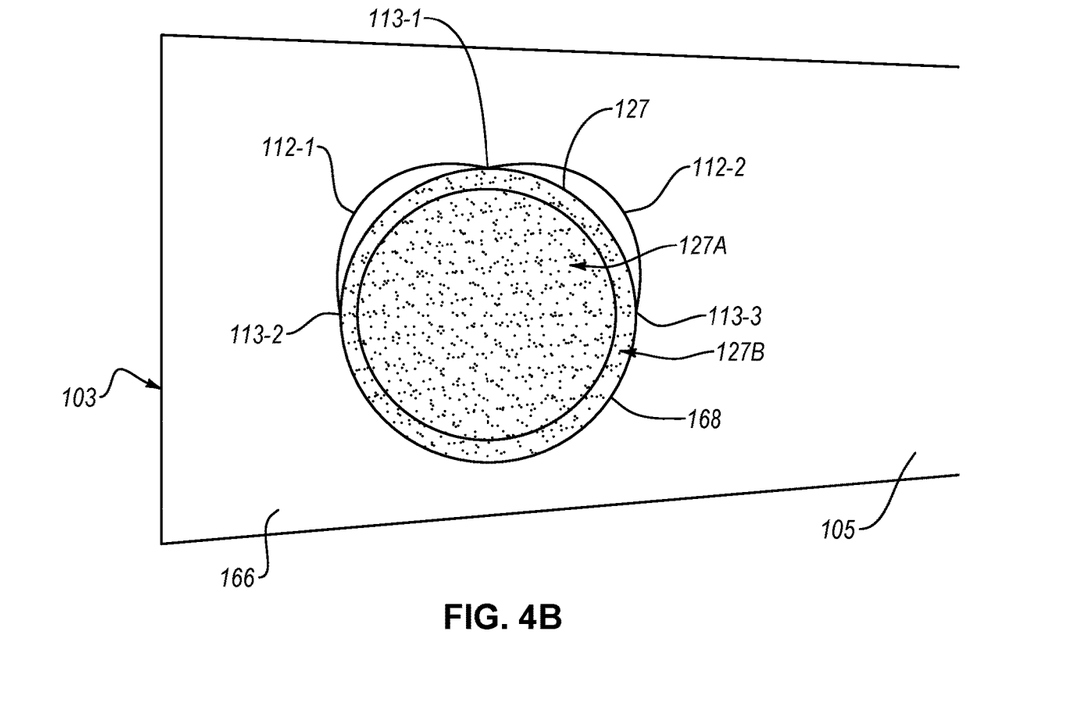
FIG. 4B is a top plan view of a pivot within the opening of the carriage of FIG. 4A, according to one or more examples of the present disclosure.

FIG. 4B is a top plan view of a pivot 127 within the opening 106 of a carriage 103, according to one or more examples of the present disclosure. In the example illustrated in FIG. 4B, the number of contact points between the pivot 127 and the carriage 103 differs from the number of contact points present in the example illustrated in FIG. 3B as a result of the different number of lobes 112-1 and 112-2. As illustrated in FIG. 4B, the pivot 127 contacts the carriage 103 at each of the multiple ridges 113-1 and 113-2 and along the regular portion 168. Thus, the gap 164 shown in FIG. 3B may not be present in the example illustrated in FIG. 4B due to the different number of ridges 113-1 and 113-2. However, the area of contact between the pivot 127 and the carriage 103 is still reduced in the example illustrated in FIG. 4B compared to an example without any lobes 112-1 and 112-2.

Figure 5A:
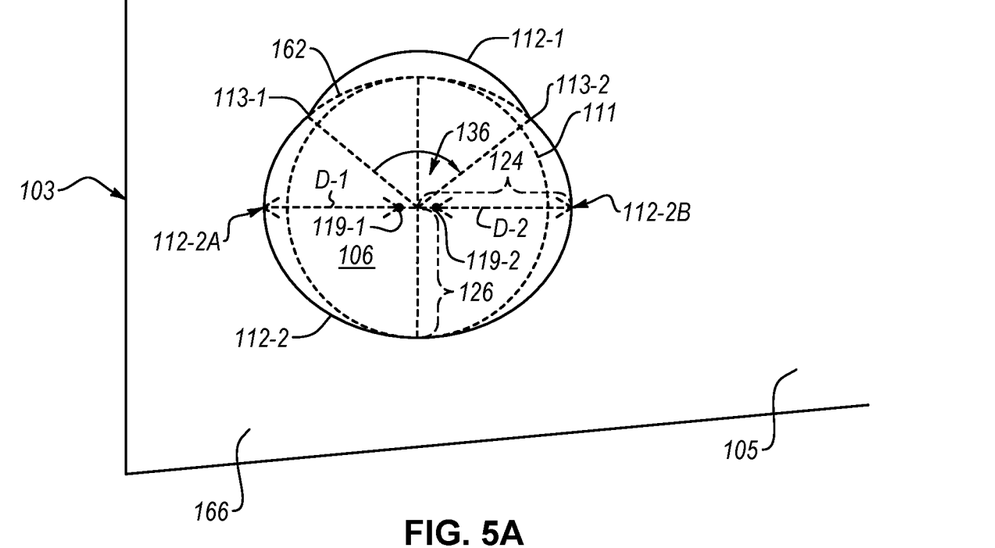
FIG. 5A is a top plan view of an opening of a carriage of a magnetic storage device, according to one or more examples of the present disclosure.

FIG. 5A is a top plan view of an opening 106 of a carriage 103, according to one or more examples of the present disclosure. As illustrated in FIG. 5A, the magnetic storage device 100 includes a carriage 103. The carriage 103 includes an opening 106 defining a central axis 108 and having multiple ridges 113-1 and 113-2. Ridges 113-1 and 113-2 are each defined by an intersection of lobes 112-1 and 112-2. The ridges 113-1 and 113-2 are parallel with the central axis 108. A cross-sectional shape of the opening 106, along a plane perpendicular to the central axis 108, includes a first lobe 112-2 and a second lobe 112-1. Each of the first lobe 112-1 and the second lobe 112-2 terminate at two of the multiple ridges (i.e., ridges 113-1 and 113-2).

Figure 5B:
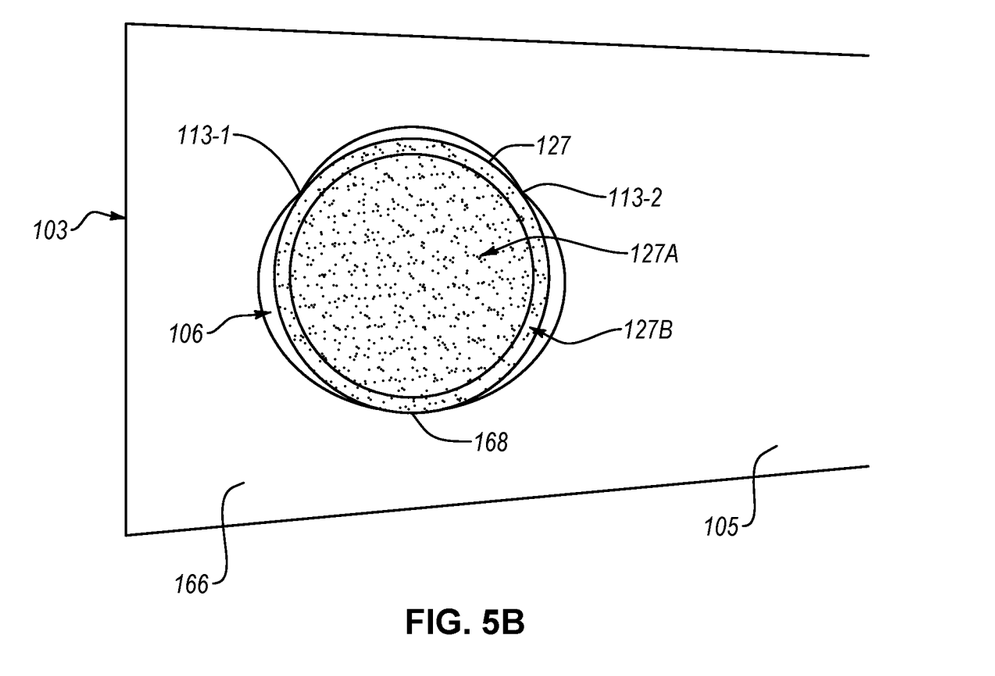
FIG. 5B is a top plan view of a pivot within the opening of the carriage of FIG. 5A, according to one or more examples of the present disclosure.

As used in connection with FIG. 5A and FIG. 5B, the second lobe 112-2 may be comparable to the "regular portion 168" of FIGS. 3A-4B. In some examples, the cross-section of the opening 106 is originally shaped similarly to the hypothetical circular shape 111 illustrated in FIG. 5A. This cross-section 111 is then enlarged laterally on either side to create an opening 106 with an ellipse cross-section shape 162, which includes the second lobe 112-2. Later, the opening 106 is enlarged by adding the first lobe 112-1. In some examples, the expansion process described in connection with FIGS. 3A and 3B is applied to create the first lobe 112-1 and/or to expand the opening from the circular shape 111 to the ellipse 162.

As illustrated in FIG. 5A, a central angle of the second lobe 112-2 is greater than 180 degrees. A central angle 136 of the first lobe 112-1 is less than 180 degrees. The second lobe 112-2 and first lobe 112-1 may contact each other at each of their two end points such that, together, the central angle of the second lobe 112-2 and the central angle 136 of the first lobe 112-1 sum to 360 degrees.

As referenced in connection with FIGS. 5A and 5B, the terms "first" and "second" lobe are meant to distinguish the two lobes 112-1 and 112-2 and do not imply any particular order of formation. In some examples, the second lobe 112-2 is formed first as part of an expansion from an originally circular shape 111 of opening 106 to the ellipse 162, and the first lobe 112-1 is added afterwards.

In some examples, a ratio of a semi-minor axis 126 of the second lobe 112-2 to a semi-major axis 124 of the second lobe 112-2 is between 1 to 1.01 and 1 to 1.2. For example, the semi-major axis 124 may be approximately 6.02 millimeters, and the semi-minor axis 126 may be approximately 5.25 millimeters. In some examples, the second lobe 112-2 includes portions 112-2A and 112-2B extending outward laterally from the circular shape 111. In some examples, portions 112-2A and 112-B are arcs with center points 119-1 and 119-2 offset laterally from the central axis 108. Each of those portions 112-2A and 112-2B expand the circular portion 111 of the cross-section of the opening into an oval shape 162. These arcs 112-1 and 112-2 may be similar or equal in dimensions. For example, dimensions D-1 and D-2 (extending from the center points 119-1 and 119-2 laterally to edges of portions 112-2A and 112-2B) are similar, and center points 119-1 and 119-2 are equally offset from the central axis 108. For example, center points 119-1 and 119-2 are each offset laterally from the central axis by about 0.752 millimeters. In some examples, dimensions D-1 and D-2 are also equal to a radius of the original circular shape 111, which is also the semi-minor axis 126 of the oval shape 162. In some examples, the semi-minor axis 162 is equal to about 5.25 millimeters, and arcs lobes 112-2A and 112-2B also have dimensions D-1 and D-2 of about 5.25 millimeters.

Reaming, etching, or any other suitable process may be employed to expand the circle of the opening 106 to an oval shape. The first lobe 112-1 may be added to the opening 106 using any suitable process. For example, the opening 106 of FIG. 5A is formed using similar processes described in connection with FIGS. 3A-4B. In some examples, a cross-section of the opening 106 originally includes a circular shape 111. That circular shape 111 is elongated by extending the opening 106 equally on each side. For example, the cross-section of the opening 106 originally includes a circle with a radius R.

FIG. 5B is a top plan view of a pivot 127 within the opening 106 of FIG. 5A, according to one or more examples of the present disclosure. As illustrated in FIG. 5A, the pivot 127 contacts the carriage 103 in three locations. These locations include the ridges 113-1 and 113-2, as well as a regular portion 168 of the second lobe 112-2. As such, the example illustrated in FIGS. 5A and 5B provides an alternative design to the opening 106 shape illustrated in FIGS. 3A and 3B while still providing the benefit of reduced areas of contact between the carriage 103 and the pivot 127, particularly in comparison to the example illustrated in FIGS. 4A and 4B, in which the pivot 127 contacts the main body 166 along the regular portion 168.

In the above description, the terms "spindle" and "pivot" may be used interchangeably to refer to any element providing a degree of rotation.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

The present subject matter may be embodied in other specific forms without departing from its spirit or essential characteristics. The described examples are to be considered in all respects only as illustrative and not restrictive. All changes which come within the meaning and range of equivalency of the claims are to be embraced within their scope.

What is claimed is:

1. A magnetic storage device, comprising:
   a carriage comprising an opening, defining a central axis and having multiple ridges parallel with the central axis, wherein a cross-sectional shape of the opening, along a plane perpendicular to the central axis, comprises:
      multiple lobes each terminating at two of the multiple ridges, wherein a quantity of the multiple ridges is one greater than a quantity of the multiple lobes; and
      a circular portion terminating at two of the multiple ridges; and
   a pivot positioned in the opening in contact with the multiple ridges, wherein:
      the pivot has a cross-sectional shape, along the plane perpendicular to the central axis that is circular; and
      the carriage is rotatable, relative to at least one portion of the pivot, about the central axis.

2. The magnetic storage device of claim 1, wherein the cross-sectional shape of the opening comprises two lobes.

3. The magnetic storage device of claim 1, wherein:
   the quantity of the multiple ridges comprises four ridges; and
   the multiple lobes comprises three lobes.

4. The magnetic storage device of claim 1, further comprising:
   an outer portion of the pivot;
   an inner portion of the pivot; and
   a base, wherein the outer portion of the pivot and the carriage are configured to rotate together relative to the base and to the inner portion of the pivot.

5. The magnetic storage device of claim 1, wherein:
   radii of the multiple lobes are the same; and
   a radius of the circular portion is equal to a distance from a center of the circular portion to each one of the multiple ridges.

6. The magnetic storage device of claim 1, wherein a total perimeter length of each one of the multiple lobes is less than a total perimeter length of the circular portion.

7. The magnetic storage device of claim 1, wherein a ratio of a radius of at least a first lobe of the multiple lobes to a radius of at least a second lobe of the multiple lobes is between, and inclusive of, 1 to 1 and 1 to 4.

8. The magnetic storage device of claim 1, wherein a distance from the central axis to each one of the multiple ridges is approximately equal to a radius of the pivot so that the pivot forms a friction fit with the multiple ridges.

9. The magnetic storage device of claim 1, wherein a radius of each one of the multiple lobes terminates at a location that is offset from the central axis of the opening.

10. The magnetic storage device of claim 1, wherein a central angle of each of the multiple lobes is less than 180 degrees.

11. The magnetic storage device of claim 1, wherein the pivot is secured to the carriage through a pin.

12. The magnetic storage device of claim 1, wherein;
   the carriage is made of at least one of the following materials: aluminum, nickel, or any combination thereof; and
   the pivot is made of stainless steel.

13. The magnetic storage device of claim 1, a first number of lobes of the multiple lobes having a total perimeter length that differs from a total perimeter length of a second number of lobes of the multiple lobes.

14. The magnetic storage device of claim 1, wherein a sum of a total perimeter length of each lobe of the multiple lobes is less than a total perimeter length of the circular portion.

15. A magnetic storage device, comprising:
   a carriage, comprising an opening defining a central axis and having multiple ridges parallel with the central axis, wherein a cross-sectional shape of the opening, along a plane perpendicular to the central axis, comprises:
      multiple lobes each terminating at two of the multiple ridges, wherein a quantity of the multiple ridges is one greater than a quantity of the multiple lobes; and
      a circular portion terminating at two of the multiple ridges.

16. The magnetic storage device of claim 15, wherein the multiple lobes comprise a first lobe and a second lobe and a ratio of a semi-minor axis of the second lobe to a semi-major axis of the second lobe is between 1 to 1.01 and 1 to 1.2.

17. The magnetic storage device of claim 1, wherein a central angle of the second lobe is greater than 180 degrees.

18. The magnetic storage device of claim 1, wherein a central angle of the first lobe is less than 180 degrees.

19. The magnetic storage device of claim 15, wherein the device comprises a hard disk drive (HDD).

20. A magnetic storage device, comprising:
   a base coupled to a number of disks;
   a pivot coupled to the base;

a carriage coupled to the pivot through a pin and comprising:
- an opening, defining a central axis and having multiple ridges parallel with the central axis, wherein a cross-sectional shape of the opening, along a plane perpendicular to the central axis, comprises:
    - multiple lobes, each terminating at two of the multiple ridges, wherein a quantity of the multiple ridges is one greater than a quantity of the multiple lobes; and
    - a circular portion terminating at two of the multiple ridges; and
- an arm with a distal end having a read/write head configured to read data from and/or write data to at least one disk of the number of disks, wherein the pivot is positioned in the opening in contact with the multiple ridges, and the pivot has a cross-sectional shape, along the plane perpendicular to the central axis, that is circular and the carriage is rotatable, relative to at least one portion of the pivot, about the central axis.

\* \* \* \* \*